Feb. 24, 1931.  C. C. FARMER  1,793,600
ANGLE COCK DEVICE
Filed Nov. 24, 1928
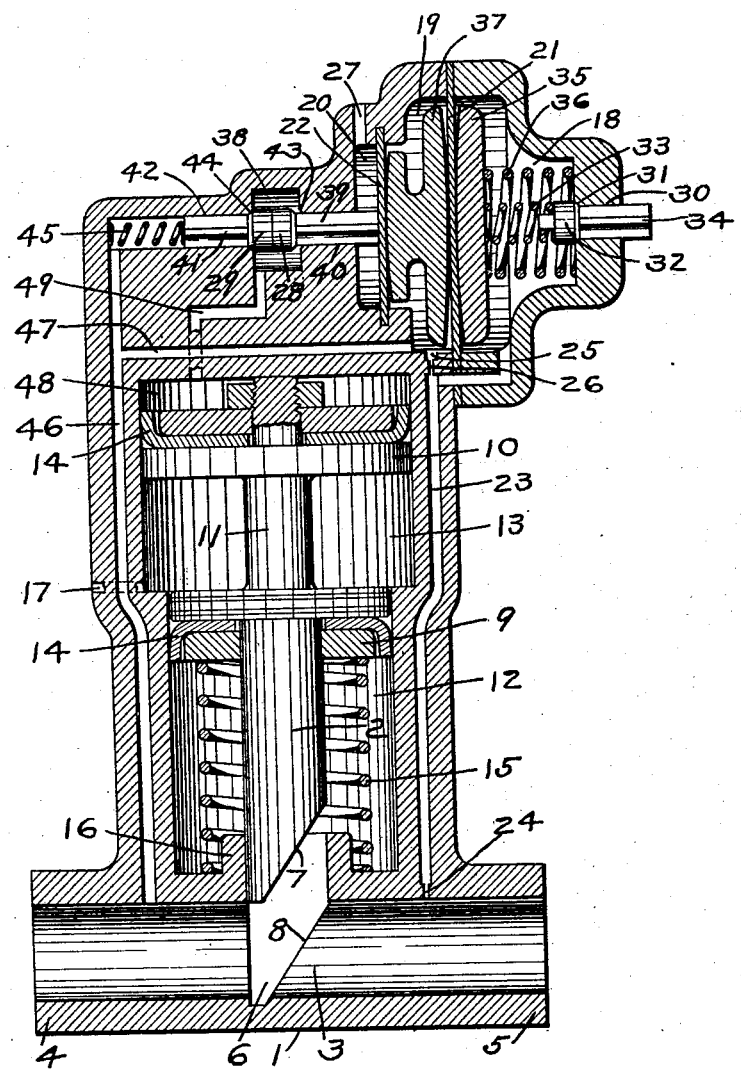
INVENTOR
CLYDE C. FARMER
BY Wm. M. Cady
ATTORNEY Patented Feb. 24, 1931

1,793,600

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

ANGLE-COCK DEVICE

Application filed November 24, 1928. Serial No. 321,543.

This invention relates to fluid pressure brakes and more particularly to an angle cock device such as employed to control communication through the brake pipe of a fluid pressure brake system.

An object of the invention is to provide an angle cock device having a gate valve which is operated by pneumatic means responsive to the actuation of a manually controlled pressure regulating valve.

Another object of the invention is to provide an angle cock device which is relatively simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing, the single figure is a diagrammatic sectional view of an angle cock device embodying the invention.

Referring to the drawing, the angle cock device may comprise a casing 1 containing a gate valve 2 adapted to be operated, in a manner to be described, to close a conduit 3 extending through the casing from the brake pipe end 4 to the flexible hose end 5 thereof.

A seat 6 is formed in the casing for the valve 2. As shown, the lower end of the valve may be provided with an inclined face 7 to provide a wedge-shaped nose, and the seat 6 may be also correspondingly formed, as at 8. In this way a better seal can be had to prevent the passage of fluid through the conduit 3 when the valve is seated.

For the purpose of actuating the valve, I prefer to employ a differential piston comprising heads 9 and 10 carried by the stem 11 of the valve. The piston 9 is mounted in a cylinder 12, while the piston 10 is mounted in a cylinder 13. Each piston 9 and 10 is provided with a cup-shaped packing ring 14 for preventing leakage of the fluid under pressure in the cylinders past the pistons during the operation of the device.

The valve 2 is retained normally in raised position by a spring 15 mounted in the cylinder 12 and bearing against one face of the piston 9, the other end of the spring encircling an annular boss 16 formed in the bottom of the cylinder 12.

The cylinder 13 has a vent 17 to the atmosphere, which vent is preferably formed adjacent to the bottom of the cylinder so as to relieve pressure against the face of the piston 10 during the downward movement of the valve 2.

The casing is provided with juxtaposed chambers 18, 19 and 20, the chambers 18 and 19 being separated by a diaphragm 21, while the chambers 19 and 20 are separated by a diaphragm 22.

The chamber 18 is connected to the portion of the conduit 3 adjacent to the hose end 5 by a passage 23 having a restricted portion 24 therein to provided a choke. The passage 23 is also connected to the chamber 19 by a port 25 having a restricted portion 26 therein to provide a choke. The chamber 20 is vented to the atmosphere as at 27.

The chamber 18 is provided with an escape or vent port 30 having a seat 31 for a valve 32. The valve 32 is retained against the seat by an expansible coil spring 33. For the purpose of enabling the valve 32 to be manually actuated, it is formed with a fluted stem 34 which projects through the port 30.

A follower plate 35 is disposed within the chamber 18, being pressed against the diaphragm 21 by an expansible coil spring 36.

A double headed follower 37 is disposed in the chamber 19, one head of this follower bearing against the diaphragm 21, while its other head bears against the diaphragm 22, so that movement of one diaphragm will be communicated to the other.

Double beat valves 28 and 29 are disposed in a chamber 38. The valve 28 has a fluted stem 39 mounted in an opening 40 formed in the casing between the chambers 20 and 38. The valve 29 has a fluted stem 41 mounted in an opening 42. The opposite end walls of the chamber 38 are formed with seats 43 and 44 for the valves 28 and 29 respectively.

A coil spring 45 mounted in the opening 42 bears against the end of the valve stem 41 and presses the end of the valve stem 39 against the diaphragm 22, so that the double beat valves will be operated by the diaphragm.

The construction is such that when the valve 28 is unseated the valve 29 is seated to close the opening 42, and vice versa when the valve 29 is unseated the valve 28 is seated to close the opening 40.

The opening 42 is connected to the brake pipe end 4 of the conduit 3 by a passage 46, which passage is also connected to the chamber 19 by a branch passage 47.

The chamber 38 is connected to a chamber 48 in the top of the cylinder 13 by a passage 49.

Normally, when the gate valve 2 is open the cylinder 12 will be charged with fluid under pressure from the conduit 3 passing upwardly through the valve seat 6. The fluid under pressure from the conduit 3 also flows through the passages 23, 46 and 47 into the chambers 18 and 19, and acting on the opposite sides of the diaphragms 21 and 22 respectively, permits the spring 36 to seat the valve 29, as shown.

With the parts so positioned, the chamber 48 is vented to the atmosphere through passage 49, chamber 38, passage 40, chamber 20 and vent 27.

When it is desired to disconnect adjoining cars fitted with the improved angle cocks without causing an emergency rate of discharge in the brake pipe pressure, the stem 34 of valve 32 on the two adjacent cars is depressed, thereby venting the chamber 18. The fluid pressure in this chamber then reduces faster than it can be built up by the flow through the passage 23 from the brake pipe, and the pressure in the chamber 19 flexes the diaphragm 21 outwardly thereby relieving the pressure of the diaphragm 22 on the end of the stem 39, which permits the spring 45 to force the stem 41 forwardly unseating the valve 29 and seating the valve 28.

The vent to chamber 38 is thus closed and the fluid pressure from the brake pipe entering this chamber from the passages 46 and 42 flows downwardly through the passage 49 into the chamber 48. As the fluid pressure in chamber 48 builds up, the differential piston is forced downwardly and this action carries the valve 2 onto the seat 6. The spring 15 is compressed by the downward movement of the piston 9.

After the valve 2 is seated and the flow of fluid from the brake pipe through the conduit 3 to the hose is thereby cut off, it is then necessary to hold only one valve 32 open. The vent valve 32 on the car being uncoupled can be released.

When the valve 2 is seated there will be a slight flow of the fluid to the atmosphere from the brake pipe side of the valve through the by-pass provided by the passages 46, 47, 25, 26, 23 and 24, and the open hose end 5. The chokes 24 and 26 will restrict or limit the amount of flow, but should it be desired to stop the flow entirely, a dummy coupling can be applied to the hose end 5, after which the valve 2 will open. It will be further noted that the valve 2 will be raised, thereby permitting unrestricted flow of the fluid through the conduit 3 when the valve 32 is seated, and the valve 2 will remain raised until the valve 32 is unseated, which action causes the fluid pressure to build up in the chamber 48 an amount sufficient to force the differential piston downwardly against the pressure of the spring 15.

When cars are coupled together an emergency rate of discharge can be transmitted through the brake pipes without causing an undesired closing of the valves 2 by reason of the fact that the pressure of spring 15 against the piston 9 will retain the valve 2 raised.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. An angle cock device comprising a casing having a conduit therethrough, a normally open valve for controlling the flow of fluid through the conduit, means for seating the valve by fluid pressure, and means for controlling the flow of fluid to said fluid pressure means including a double beat valve.

2. An angle cock device comprising a casing having a conduit therethrough, a normally open valve for controlling the flow of fluid through the conduit, means for seating the valve by fluid pressure, a double beat valve for controlling the flow of fluid to said pressure means, and means for actuating the double beat valve by fluid pressure.

3. An angle cock device comprising a casing having a conduit therethrough, a normally open valve for controlling the flow of fluid through the conduit, means for seating the valve by fluid pressure, a double beat valve for controlling the flow of fluid to said pressure means, a diaphragm for actuating the double beat valve, and means for controlling the fluid pressure against the diaphragm.

4. An angle cock device comprising a casing having a conduit therethrough, a normally open gate valve for controlling the flow of fluid through the conduit, a cylinder, a piston mounted in the cylinder for actuating the valve, a by-pass around the valve and the cylinder, and means connecting the by-pass and the cylinder for controlling the fluid pressure on one side of the piston.

5. An angle cock device comprising a casing having a conduit therethrough, a normally open gate valve for controlling the flow of fluid through the conduit, a cylinder, a piston mounted in the cylinder for actuating the valve, and means for controlling the fluid pressure on one side of the piston including a by-pass having a double beat valve.

6. An angle cock device comprising a casing having a conduit therethrough, a normally open gate valve for controlling the flow of fluid through the conduit, a cylinder, a piston mounted in the cylinder for actuating the valve, a by-pass around the valve and the cylinder, a double beat valve for controlling the flow of fluid through the by-pass, a passage connecting the by-pass and the cylinder on one side of the piston, said passage being opened or closed by the double beat valve, and means for manually and pneumatically actuating the double beat valve.

7. An angle cock device comprising a casing having a conduit therethrough, and a differential piston operated gate valve for controlling the flow of fluid through the conduit.

8. An angle cock device comprising a casing having a conduit therethrough, a valve for controlling the flow of fluid through the conduit, and a differential piston for operating the valve.

9. An angle cock device comprising a casing having a conduit therethrough, a gate valve for controlling the flow of fluid through the conduit, means for actuating the valve including a fluid pressure operated piston, a double beat valve for controlling the flow of fluid to the piston operating means, and manual and pneumatic means for actuating the double beat valve.

10. An angle cock device comprising a casing having a conduit therethrough, a gate valve for controlling the flow of fluid through the conduit, means for actuating the valve including a fluid pressure operated piston, a double beat valve for controlling the flow of fluid to the piston operating means, and manual and pneumatic means for actuating the double beat valve, said pneumatic means being responsive to the actuation of the said manual means.

11. An angle cock device comprising a casing having a conduit therethrough, a gate valve for controlling the flow of fluid through the conduit, a differential piston connected to the valve, a by-pass communicating with the conduit on each side of the valve, and means responsive to the pressure of fluid in the by-pass for actuating the said piston.

In testimony whereof I have hereunto set my hand, this 22nd day of November, 1928.

CLYDE C. FARMER.